Figure 1:
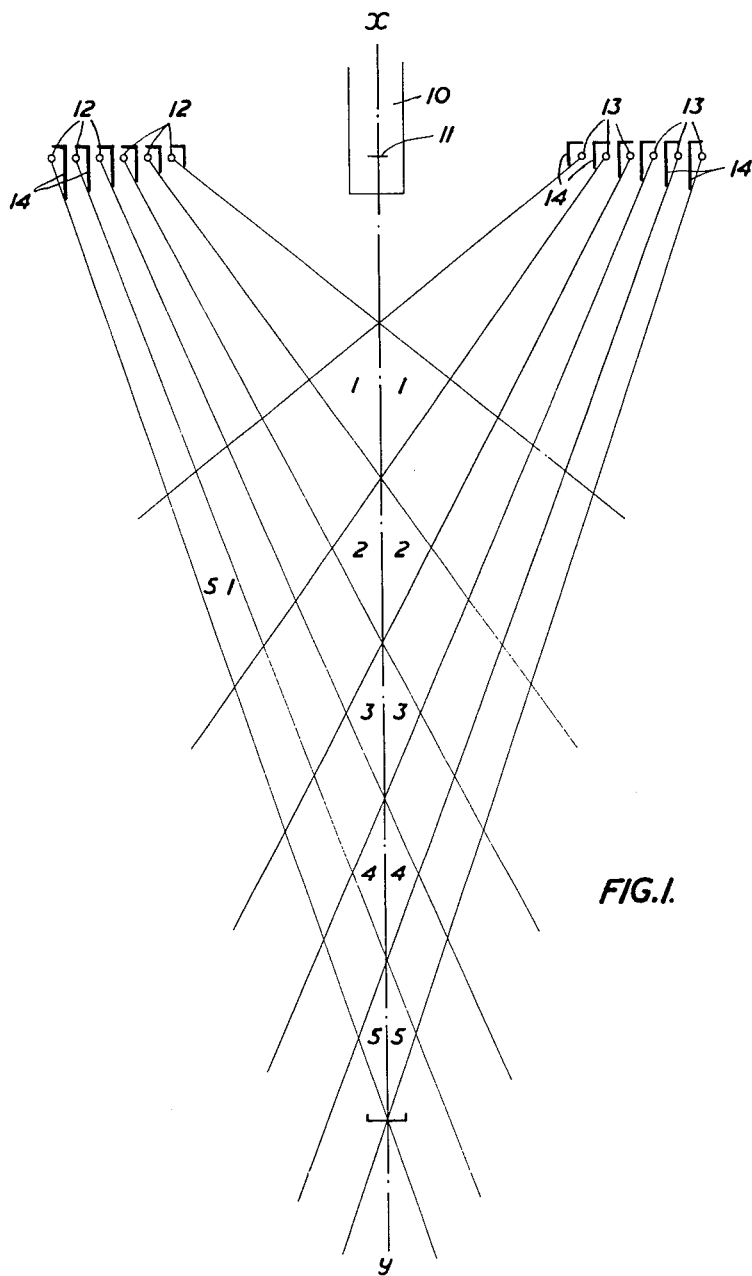

Aug. 31, 1965  W. J. FILLERY  3,204,218
GUIDANCE APPARATUS FOR AIRCRAFT IN LANDING
Filed Feb. 25, 1963  3 Sheets-Sheet 3

William J. Fillery
Inventor
By Cushman, Darby & Cushman
Attorneys

United States Patent Office 3,204,218
Patented Aug. 31, 1965

3,204,218
GUIDANCE APPARATUS FOR AIRCRAFT IN LANDING
William James Fillery, Holywood, County Down, Northern Ireland, assignor to Short Brothers & Harland Limited, Belfast, Northern Ireland, a British company
Filed Feb. 25, 1963, Ser. No. 260,373
4 Claims. (Cl. 340—25)

It is the object of this invention to provide improved apparatus for the guidance of aircraft pilots in landing, affording visual information concerning the lateral position of the aircraft in relation to the desired centre-line of approach and to its distance from the desired touch-down position thereon.

The apparatus provided in accordance with the invention comprises two sets or arrays of light sources, respectively disposed on opposite sides of the runway or glide path, the light sources of each set or array being spaced apart along a substantially horizontal line so as to be separately visible at the commencement of a final approach, and individually shrouded so that each is visible only before reaching a position in a predetermined sector of the landing area whereby a pilot may establish his distance from a touch-down position. Each set or array of light sources (hereinafter referred to briefly as "lamps") may be an assembly of a plurality of lamps, situated at equidistantly spaced points along a straight line normal to the runway or glide path, the beams from one such set being convergent with those of the other set, so that each lamp of one set or array is matched by a corresponding lamp in the other set or array, the beams of the two matched lamps intersecting on the centre-line of the glide path.

The manner in which the invention may be carried into effect may be more clearly understood by reference to the accompanying drawings, the three figures of which are diagrammatic plan views of the approach to an airport landing strip or runway, each illustrating a different manner of carrying the invention into effect, as hereinafter described.

In said drawings, the reference numeral 10 designates an airport landing strip or runway 10, on which the desired touch-down point is indicated at 11, the centre-line of the approach path extending between $x$ and $y$. At each side of the point 11, and disposed in rows normal to the line $x$–$y$, are two sets of lamps 12, 12 and 13, 13, each of which is provided with shrouds 14, located one on that side of each lamp nearer to the runway. The lamps of each set are sufficiently widely spaced to enable them to be resolved as separate sources of light by a pilot of an approaching aircraft on commencing his run-in.

The provision of the shrouds 14 is effective to cause lamps to be occulted at predetermined stations on the approach path as the aircraft nears the point 11. Thus, from a position in the region indicated by the numeral 5, 5, five lamps of each set will be visible, and from each successive region 4, 4; 3, 3; 2, 2; and 1, 1, the number of visible lamps in each set is reduced by one, giving the pilot the information that he is approaching the touch-down point 11 along the desired glide path line $x$–$y$. If the pilot can see five lamps 12 and only one lamp 13, it follows that the aircraft is over the region denoted by the numerals 5, 1 and that a change of course to starboard is required to bring him over the line $x$–$y$.

Figure 2:
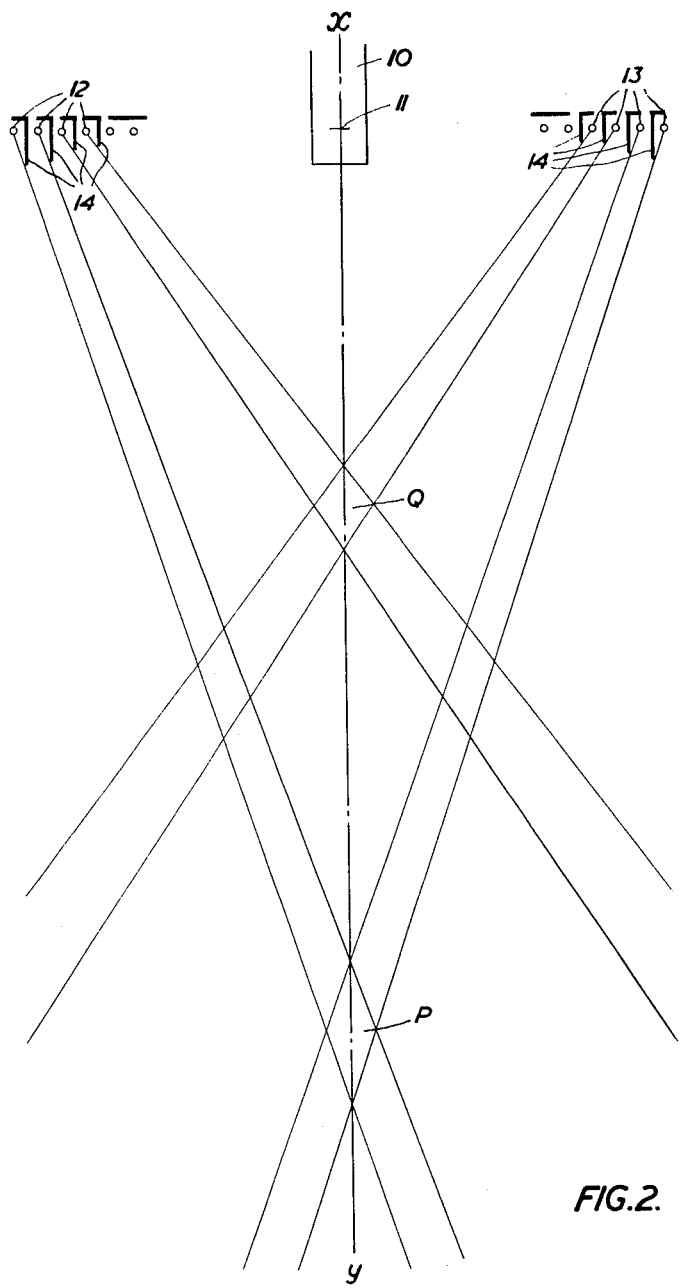

The occultation may be arranged so that the lamps are shrouded individually or in groups, or at pre-determined ranges, the number of lamps visible being an indication either of equal increments of range or, as shown in FIG. 2, of outer and middle marker zones, P and Q respectively.

Figure 3:
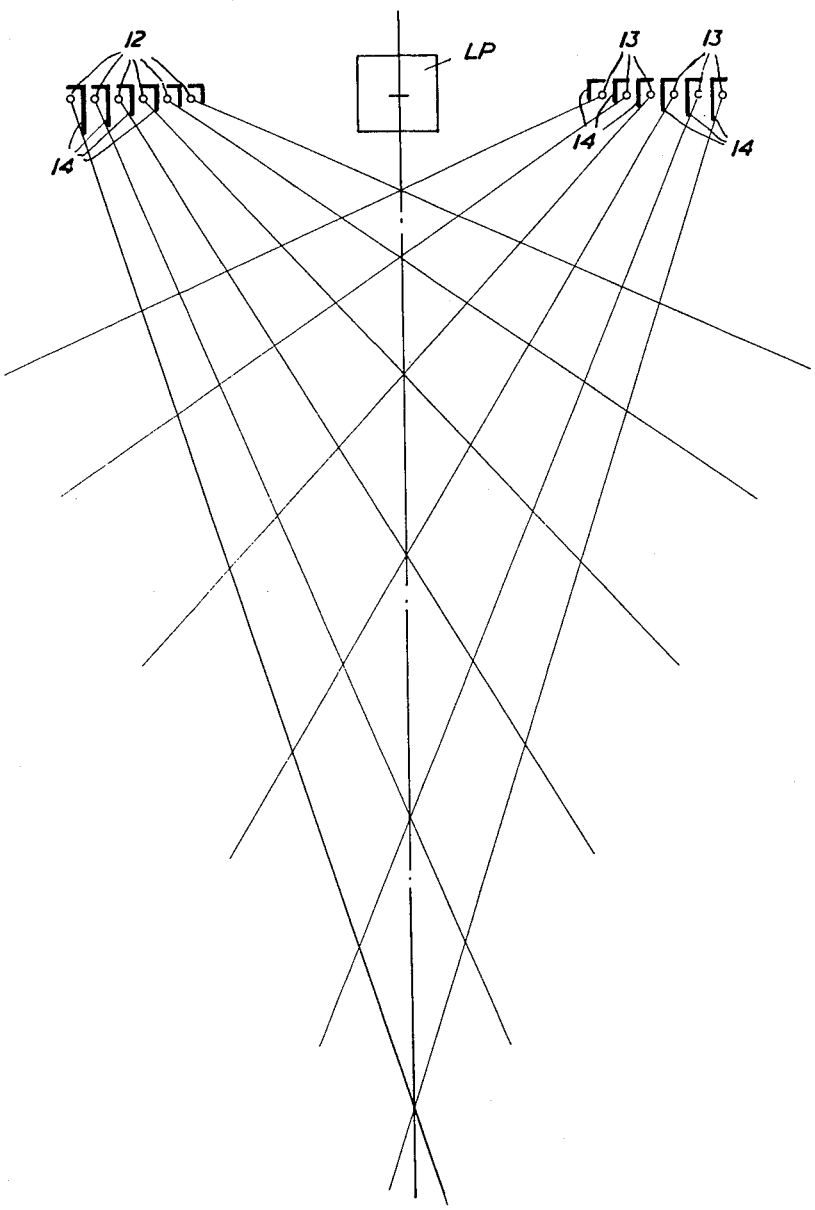

The arrangement shown in FIG. 3 is suitable for use in the case of an aircraft which must follow a predetermined programme during an approach (e.g., a V.T.O.L. aircraft which must arrive over a landing pad LP with zero forward speed), the shrouds are arranged to occult lamps at stages in the programme such that the number of lamps visible bears a simple relation to the desired speed, i.e., five lamps of each set 100 knots, four lamps of each set 80 knots, three lamps of each set 60 knots.

What I claim as my invention and desire to secure by Letters Patent is:

1. Landing-guidance apparatus for aircraft pilots, comprising two sets or arrays of a plurality of light sources, respectively disposed on opposite sides of the runway or glide path, the individual light sources of each set or array being spaced apart along a substantially horizontal line athwart the runway so as to be separately visible at the commencement of a final approach, and individually shrouded so that each is visible only before reaching a position in a predetermined sector of the landing area, whereby a pilot may establish his distance from a touch-down position.

2. Apparatus as claimed in claim 1, wherein each set or array of light sources consists of an assembly of a plurality of lamps, the beams from one such set being convergent with those of the other set, so that each lamp of one set or array is matched by a corresponding lamp of the other set or array.

3. Apparatus as claimed in claim 2, wherein said lamps of each set are situated at equidistantly spaced points along a straight line normal to the runway or glide path.

4. Apparatus as claimed in claim 2, wherein there is provided on that side of each lamp nearer to the runway or glide path a shroud of an effective length such as to occult the rays of said lamp at the desired angle.

References Cited by the Examiner

UNITED STATES PATENTS
2,597,321 5/52 Hergenrother _____ 240—1.2 XR

FOREIGN PATENTS
806,793 12/58 Great Britain.

THOMAS B. HABECKER, *Acting Primary Examiner.*

NEIL C. READ, *Examiner.*